United States Patent
Dinkel et al.

(10) Patent No.: US 6,428,121 B1
(45) Date of Patent: Aug. 6, 2002

(54) PRESSURE CONTROL DEVICE

(75) Inventors: Dieter Dinkel, Eppstein; Hans-Dieter Reinartz, Frankfurt, both of (DE)

(73) Assignee: Continental Teves AG & Co., oHG, Frankfurt (DE)

(*) Notice: Subject to any disclaimer, the term of this patent is extended or adjusted under 35 U.S.C. 154(b) by 0 days.

(21) Appl. No.: 09/890,528

(22) PCT Filed: Jan. 31, 2000

(86) PCT No.: PCT/EP00/00761

§ 371 (c)(1),
(2), (4) Date: Aug. 1, 2001

(87) PCT Pub. No.: WO00/46089

PCT Pub. Date: Aug. 10, 2000

(30) Foreign Application Priority Data

| Feb. 1, 1999 | (DE) | 199 03 931 |
| Feb. 1, 1999 | (DE) | 199 03 930 |
| May 3, 1999 | (DE) | 199 20 171 |

(51) Int. Cl.$^7$ .............. B60T 8/36; B60T 8/34; F15B 21/04; B60K 28/16; F16K 49/00
(52) U.S. Cl. ............ 303/191; 303/119.2; 303/DIG. 10; 303/119.3; 303/1
(58) Field of Search ............... 303/113.1, 20, 303/1, 119.2, 119.3, 191, DIG. 10; 701/70, 80

(56) References Cited

U.S. PATENT DOCUMENTS 6,007,162 A * 12/1999 Hinz et al. ............... 303/191

FOREIGN PATENT DOCUMENTS

| DE | 37 09 189 | 9/1988 |
| DE | 91 02 352 | 6/1992 |
| DE | 195 47 111 | 6/1997 |
| DE | 196 42 192 | 4/1998 |
| DE | 297 12 033 | 11/1998 |
| DE | 197 54 163 | 4/1999 |
| DE | 199 02 033 | 3/2000 |
| GB | 1 345 087 | 1/1974 |
| WO | 96 33081 | 11/2000 |

OTHER PUBLICATIONS

Search Report of the German Patent Office for Application No. 199 20 171.4.

* cited by examiner

Primary Examiner—Douglas C. Butler
(74) Attorney, Agent, or Firm—Rader, Fishman & Grauer PLLC

(57) ABSTRACT

The present invention relates to a pressure control device for hydraulic automotive vehicle brake systems with wheel slip control which is especially suited for an operation in the automatic brake intervention, with a first housing for accommodating pressure fluid channels into which valve elements such as pressure control valves and/or pump elements are inserted, with a second housing arranged on the first housing for the accommodation of electric and/or electronic structural elements connected to the pressure control valves, as well as with an electric motor for driving the pump elements. At least one heating element is provided in the first housing and is connected to the electric and/or electronic structural elements in the second housing, and the heating element is disposed in an area of the first housing which includes hydraulic channels for fluid supply to the pump elements which represent a hydraulic flow resistance.

9 Claims, 3 Drawing Sheets

PRESSURE CONTROL DEVICE

TECHNICAL FIELD

The present invention generally relates to vehicle brake systems, and more particularly relates to a pressure control device for hydraulic automotive vehicle brake systems with wheel slip control which is equipped especially with means for the automatic brake intervention.

BACKGROUND OF THE INVENTION

DE 37 09 189 A1 discloses a pressure control device for a wheel-slip controlled hydraulic automotive vehicle brake system which, for heating the valves arranged in a block-shaped housing, includes a heating device which, as an electric resistance heating in the form of a heating cartridge, either points into the valve block, or utilizes the heat in cooling water of a combustion engine for heating a passage bore in the valve block. The heating devices proposed have proved to be complicated and of little practicable value.

In view of the above, an object of the present invention is to improve upon a pressure control device of the type mentioned hereinabove so that a particularly effective heating of determined points of the pressure control device is effected with the simplest possible means at low cost.

DETAILED DESCRIPTION OF THE PREFERRED EMBODIMENT

Figure 1:
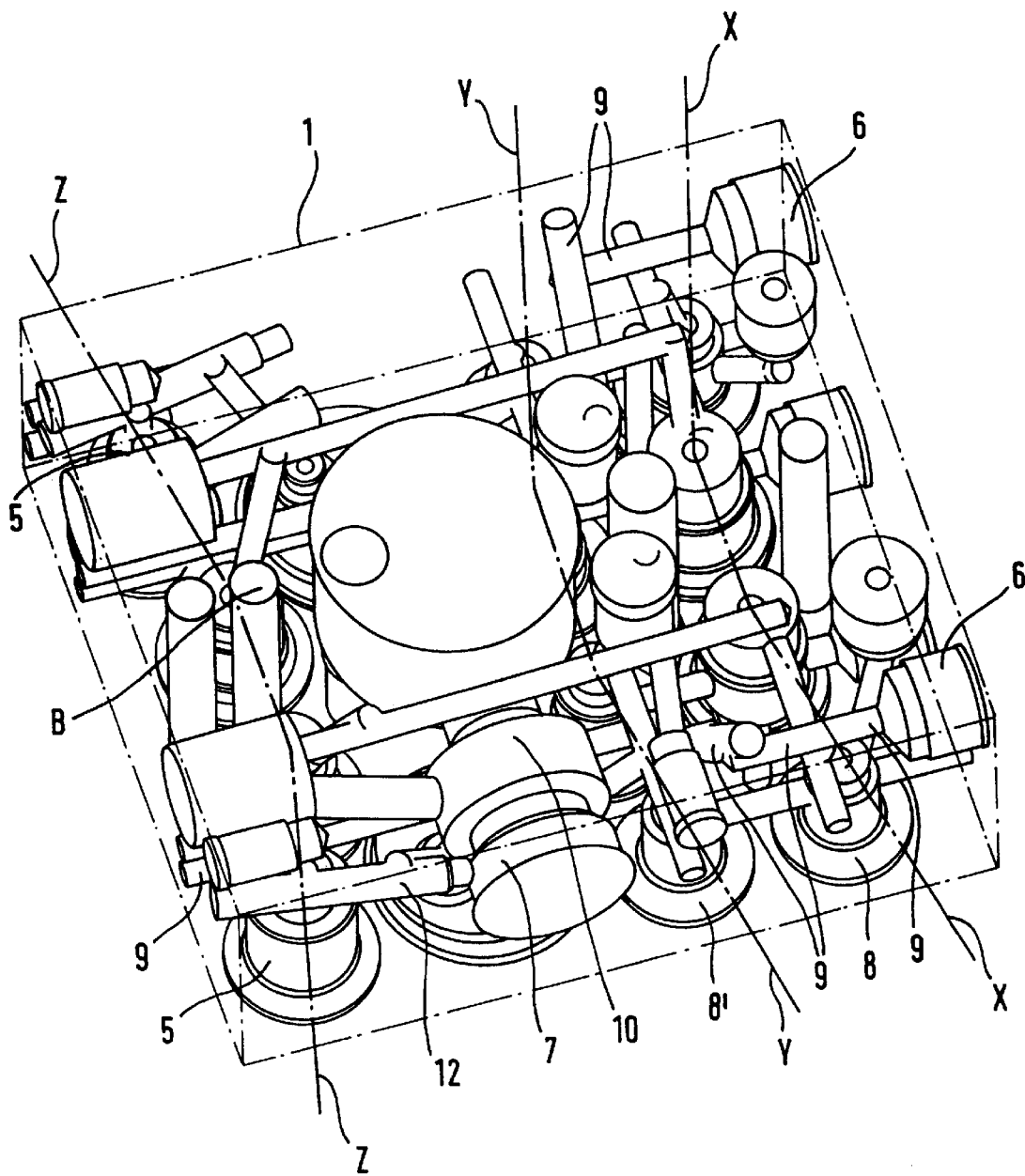
FIG. 1 is an illustration of an embodiment of a housing for a pressure control device.

FIG. 1 shows the spatial arrangement of the housing 1 for a suitable embodiment of the hydromechanic part of the pressure control device. The arrangement of bores in the block of housing 1 serves for the accommodation of pressure control valves and an electric motor 11 for driving a pump 10 in the housing 1. A pump bore 7 is associated with the pump 10. In a first valve row X in the housing 1, there are valve-accommodating bores 8 for the electromagnetically operable inlet valves. Valve-accommodating bores 8' for the electromagnetically operable outlet valves are provided in parallel thereto in a second valve row Y. Due to the accommodating bores for the pump, both above-mentioned valve rows X, Y are spaced from a third valve row Z which arranges for several valve-accommodating bores 5 for electric change-over valves and separating valves.

By way of the illustrated arrangement of bores in the housing block, the valves of the third valve row Z permit a traction slip control operation and an automatic brake operation, for example, for driving dynamics control. Corresponding braking pressure generator ports 6 for both brake circuit portions formed by the arrangement of bores in the block open into the right lateral surface of the housing 1. By way of the pressure fluid channels in the housing 1, ports 6 provide a connection to the valve-accommodating bores 8, 8' of the valve row X, Y and the valve-accommodating bores 5 of the valve row Z.

The arrangement of the heating element 4 in an opening 5 which is particularly relevant for the present invention will be described hereinbelow.

The two electric change-over valves to be installed into the valve-accommodating bores 5 of the valve row Z are the primary objects to be heated. The heating element 4 which is preferably rod-shaped or plate-shaped and is to be inserted into the opening B is not shown. Heating element 4 can be taken from the following description of FIG. 2. Corresponding to the description of FIG. 1, there is provided in detail a central arrangement of the opening B between the valve-accommodating bores 5 in the housing 1 which ensures a heat transfer as, good as possible both in the direction of the valve-accommodating bore 5 and in the direction of the suction channel 9 that leads to the valve-accommodating bore 5. The arrangement of the opening B automatically ensures a corresponding heating of the pump suction area so that all flow portions in the housing 1 which are relevant in terms of viscosity and, thus, temperature and represent a specific hydraulic flow resistance in the operation of the pressure control device can be heated controlledly.

It is especially advantageous in the disclosed arrangement of bores in the housing that the opening B in the practice is separated only by a small distance from the suction channel 9, an even heat transfer to the suction channel 9 being ensured by the proximity of the channel. Further, the present invention proposes that the opening B ends into the housing 1 roughly vertically and roughly centrically between the above-mentioned valve row Z. Thus, the illustration exhibits an optimal arrangement of bores in the housing block for heating the valve-accommodating bore 5 and the pump suction channel 12 of each one brake circuit. As can be seen, the pressure control device is intended for use in dual-circuit brake systems so that all bores arranged in the housing 1 of the first brake circuit portion can be found in the second brake circuit portion in a mirror-inverted way, even if they are not illustrated in detail.

The equipment of the above-mentioned opening B with the corresponding heating element 4 is respectively important when the pressure control device is used in the operation of the brake system at low temperatures because, due to the high viscosity of the brake fluid, there occur automatically especially great hydraulic flow resistances in the areas of the housing 1 described hereinabove which, without a specific heating of the suction area, can cause a considerable delay in the pressure reduction to be effected by the pump.

Figure 2:
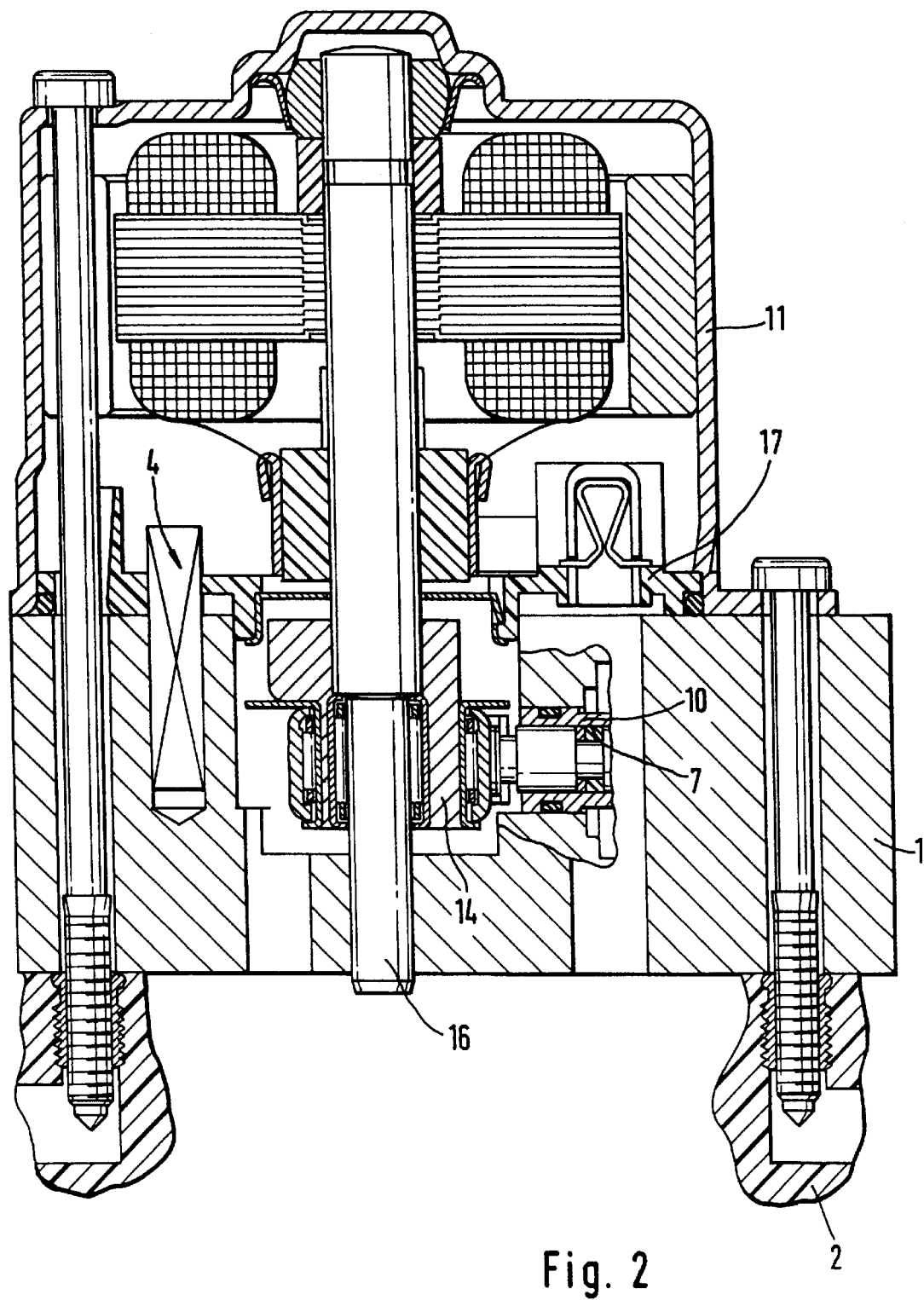
FIG. 2 is a side view of the essential details of this invention for the pressure control device according to FIG. 1 in an overall view.

With reference to FIG. 1, FIG. 2 shows a complete side view of the pressure control device fitted with the electric motor 11, including a partial cross-sectional view of the housing which discloses the heating element 4 in the form of a heating rod in the opening B that is arranged paraxially to the electric motor 11 at the level of the valve row Z according to the preceding illustration. An optimal heating of the adjacent channels is realized in a very short time due to this parallel arrangement.

Although shown in FIG. 2 only in part, a cover-shaped second housing 2, equipped with electric and/or electronic structural elements 3, is seated on the first housing 1 described already in FIG. 1. Housing 2 provides the necessary connection for heating the heating element 4 by a suitable electrical contacting. The plug connector 13 proposed to this end (see FIG. 3) permits a simple contacting with the brush carrier plate 17 of the electric motor 11, to which also the heating element 4 is attached so that a prefabricated assembly unit is achieved which is very easy to assemble. Suitably, the housing 2 accommodates all electronic structural elements 3 required for a controlling and regulating function of the pressure control device so that the controller integrated in the housing 2 along with its corresponding power drivers and control elements provides an appropriate electronic control member not only for the purpose of heating the heating element 4, but also for the pressure control valves integrated in the housing 1 and projecting with their magnetic coils in the direction of the housing 2, as well as for driving the electric motor 11 arranged remote from it on the opposite front surface of the housing 1 and including the heating element 4.

It is of course also possible, irrespective of the relatively compact integration of the electronic, electric, hydraulic, and mechanic components, to ensure energization of the heating element 4 independent of the housing 2 by means of an external current source, for example. This would cause a modified type of electrical connection, however.

Figure 3:
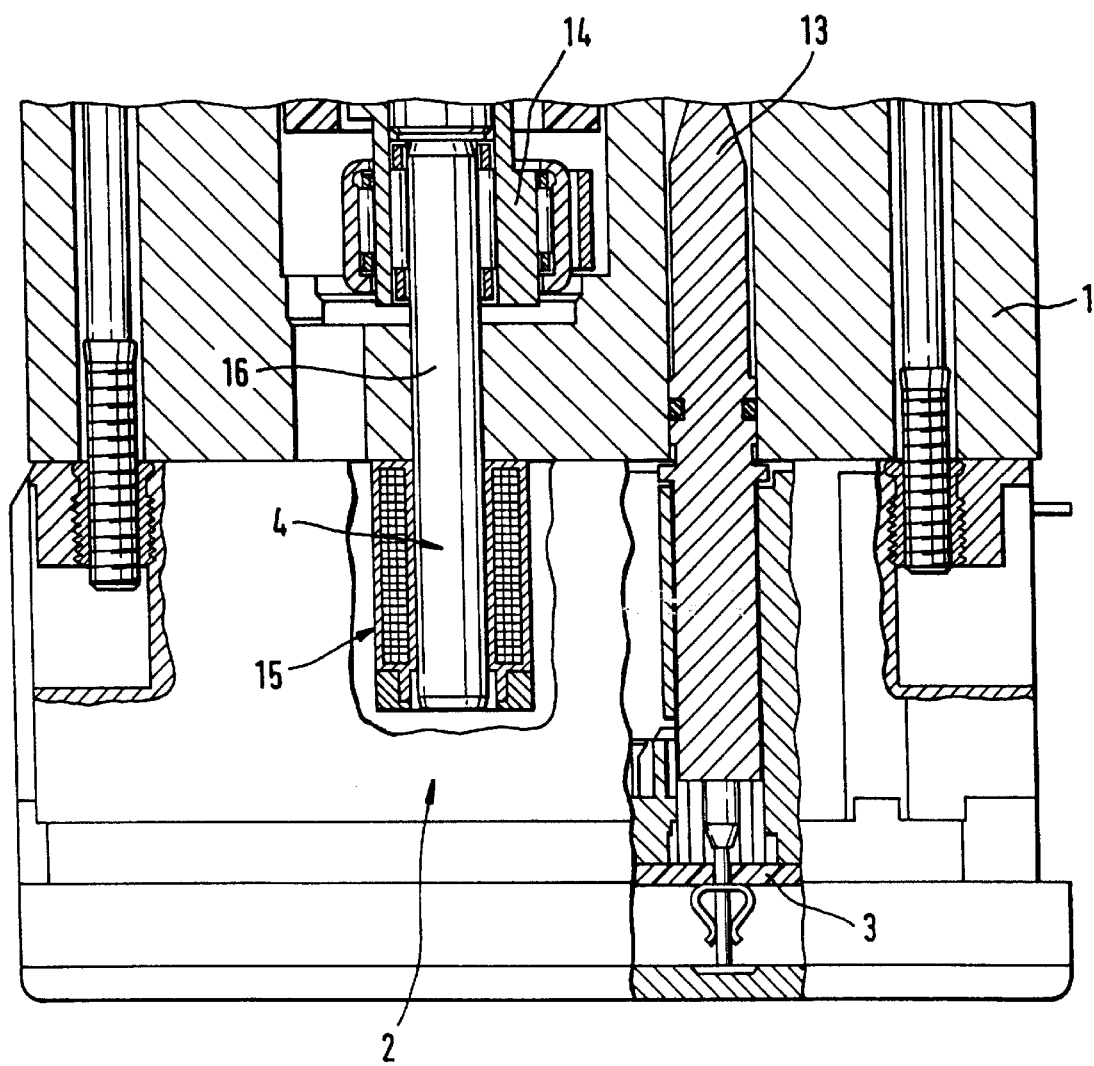
FIG. 3 is a side view of the pressure control device known from FIG. 2 in an alternative embodiment of a heating element in a coaxial arrangement relative to the axis of the electric motor.

Different from the preceding illustrations of the present invention in FIGS. 1 and 2, an alternative, equally effective heating of the channels in the housing 1 shall now be described by way of FIG. 3 which ensures a direct heat transfer by way of the heating element 4 to the housing 1 in the area of the motor axle 16. To this end, heating of the housing 1 by way of a heating coil 15 fitted to the motor axle 16 is suggested according to the design in FIG. 3. In this arrangement, the introduction of heat takes place via the motor axle 16 which projects into the space in housing 2 and, simultaneously, accommodates the eccentric drive 14 for the operation of the pump pistons in the pump and motor-accommodating bore of the housing 1. Consequently, the heating element 4 is formed of the heating coil 15 and the rod-shaped motor axle 16 which is fixed coaxially to the motor shaft in the first housing 1. The electric and mechanic connection of the heating coil 15 and the necessary valve coils is preferably achieved as a construction unit integrated in the housing 2, and the necessary controlling and regulating electronics is also a component part of the housing 2. In order to efficiently conduct heat, housing 1 preferably consists of a light metal alloy or of steel. In case not all details of the pressure control device can be taken from FIG. 3, these details correspond to the description according to FIG. 2.

Finally, it is important that components of the electro-magnetically operable pressure control valves form a hydraulic component within the valve-accommodating bores 8, 8', 5 of the block-shaped housing 1, while the electromechanic actuating circuit with the valve coils and the heating coil 15 is a part of the housing 2. Housing 2 accommodates electric and electronic components 3 for the operation of the pressure control device so that the cover-shaped housing 2 comprises the electric and electronic components. Thus, a preassembled electromechanic and electronic unit is achieved in housing 2. Contacting of the heating coil 15 on the electronic controller is carried out preferably by soldering or as a plug connection with the electric circuit which is configured as a conductor plate, conductor foil, or as a punched grid.

In the embodiments of FIGS. 1 and 2 described hereinabove, the heating element 4 can be configured in the simplest case as a coated resistance heating rod or as a thermally controlled resistor, a so-called PTC element. For a better heat transfer between the heating element 4 and the opening B which, from the direction of the motor flange, opens vertically into the housing 1, a heat conducting paste may additionally be introduced into the opening B, when needed. The controlling and/or regulating electronics which is primarily integrated already in the cover-shaped housing 2 permits realizing not only the braking pressure control function necessary for the operation of the pressure control device but also the electronics or electrics, inclusive a temperature sensing and regulating device, required for the operation of the heating elements 4, while sophisticated external cables are avoided.

Along with the installation of the electric motor 11 on the first housing 1, according to FIG. 2, the heating element 4 preassembled on the brush carrier plate 17 is automatically inserted in a simple fashion into the opening B of the housing 1, and the brush carrier plate 17 is electrically connected in a simple manner to the electronic controller in the housing 2 by way of the electric plug connector 13 which extends through the housing 1.

Generally rod-shaped heating elements 4 are suggested in all above-mentioned embodiments of the present invention. This represents only one of the possible variations with respect to FIG. 2. Geometrical modifications of the heating element 4 in the form of plate-shaped or spiral-shaped heating elements 4 are possible depending on the case of application, however, without departing from the fundamental idea of this invention.

LIST OF REFERENCE NUMERALS

1 first housing
2 second housing
3 structural elements
4 heating element
5 valve-accommodating bore
6 braking pressure generator port
7 pump bore
8,8' valve-accommodating bore
9 suction channel
10 pump
11 electric motor
12 pump suction channel
13 plug connector
14 eccentric drive
15 heating coil
16 motor axis
17 brush carrier plate
B opening

What is claimed is:

1. Pressure control device for hydraulic automotive vehicle brake systems with wheel slip control, comprising:
   first housing for accommodating at least one pressure fluid channel,
   at least one valve element residing in said at least one pressure fluid channel,
   a second housing arranged on the first housing for accommodating electric structural elements connected to the at least one valve element, as well as for accommodating an electric motor for driving the at least one valve element,
   at least one heating element provided in the first housing, wherein said at least one heating element is connected to said electric structural elements is connected to the electric and/or electronic structural elements in the second housing, and wherein the at least one heating element is disposed in an area of the first housing which includes hydraulic channels means for conducting the flow of fluid to pump elements and representing a hydraulic flow resistance.

2. Pressure control device as claimed in claim 1, wherein the hydraulic flow resistance is formed of a pressure control valve that is inserted into a valve-accommodating bore, wherein said pressure control valve provides a controllable hydraulic connection between a braking pressure generator port opening at the first housing and a pump bore arranged in the first housing.

3. Pressure control device as claimed in claim 2, wherein the hydraulic flow resistance is formed by a pump valve which is arranged in a pump bore downstream of the hydraulic connection of a braking pressure generator port that leads to the valve-accommodating bore.

4. Pressure control device as claimed in claim 2, wherein the hydraulic flow resistance is formed by a suction channel that leads to a pump bore and connects a brake pressure generator port of the first housing to a valve-accommodating bore in the first housing, in which bore a pressure control valve resides.

5. Pressure control device as claimed in claim 1, wherein the first housing includes an opening configured as a blind-end bore which leads in parallel or transversely to said at least one pressure fluid channel.

6. Pressure control device as claimed in claim 5, wherein said at least one heating element is configured as a heating rod which is fastened to the electric motor and extends with a smallest possible clearance into the said blind end bore opening of the first housing when the first and second housings are joined.

7. Pressure control device as claimed in claim 1, wherein the at least one heating element is configured as a resistance heating element.

8. Pressure control device as claimed in claim 1, wherein said at least one heating element is configured as a PTC element.

9. Pressure control device as claimed in claim 1, wherein the at least one heating element along with the second housing forms an operable subassembly which can be handled independently.

* * * * *

UNITED STATES PATENT AND TRADEMARK OFFICE
CERTIFICATE OF CORRECTION

| | | |
|---|---|---|
| PATENT NO. | : 6,428,121 B1 | |
| DATED | : August 6, 2002 | |
| INVENTOR(S) | : Dieter Dinkel and Hans-Dieter Reinartz | |

It is certified that error appears in the above-identified patent and that said Letters Patent is hereby corrected as shown below:

<u>Column 4,</u>
Line 43, change "first housing for" to -- a first housing for --.

Signed and Sealed this

Eleventh Day of February, 2003

JAMES E. ROGAN
*Director of the United States Patent and Trademark Office*